June 10, 1969 LA ROY B. PASSER 3,448,651
EXPANSION BOLTS
Filed June 2, 1967
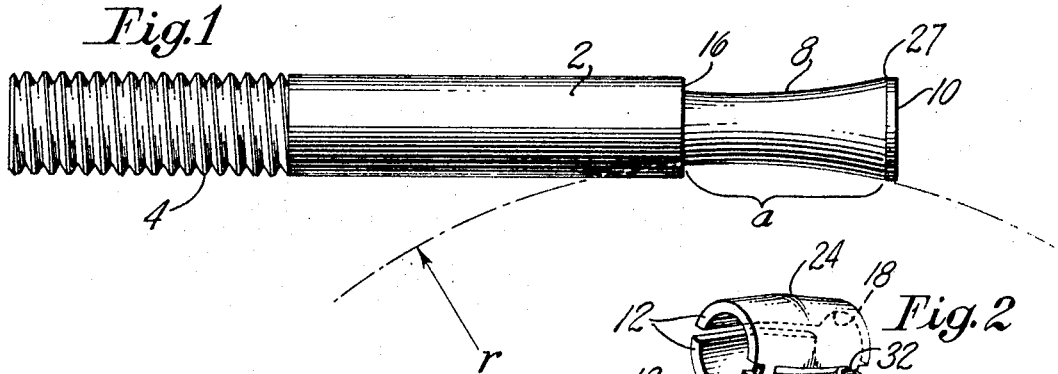
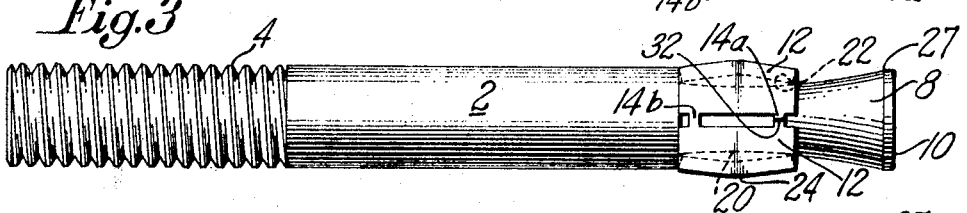
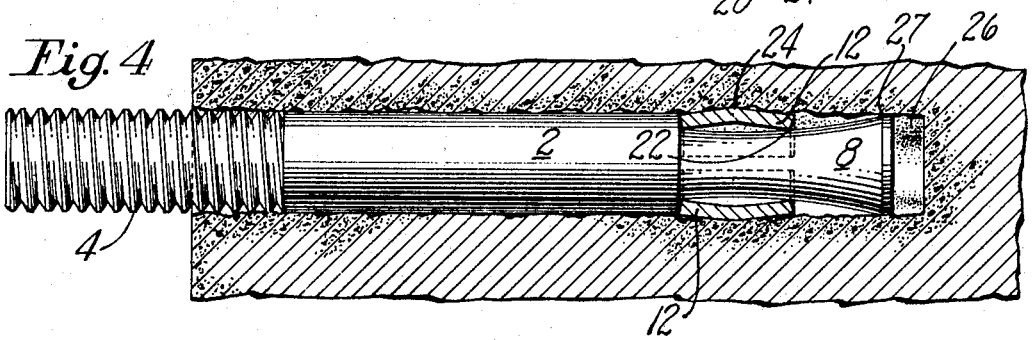
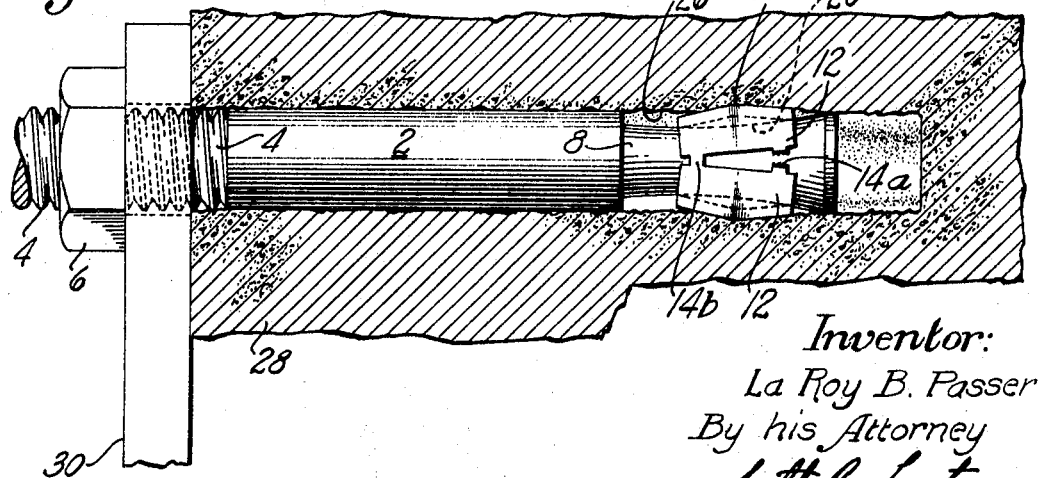
Inventor:
La Roy B. Passer
By his Attorney United States Patent Office 3,448,651
Patented June 10, 1969

3,448,651
EXPANSION BOLTS
La Roy B. Passer, Wyomissing, Pa., assignor to USM Corporation, Boston, Mass., a corporation of New Jersey
Filed June 2, 1967, Ser. No. 643,224
Int. Cl. F16b 13/06
U.S. Cl. 85—72      4 Claims

ABSTRACT OF THE DISCLOSURE

An expansion bolt assembly comprising an elongated cylindrical bolt member with one end of the bolt member having an expansion portion, the longitudinal surface of which defines an arc of a circle. At least one expansion member is slidably mounted on the expansion portion of the bolt member and is movable to engage the interior of a bore in which the bolt is disposed.

BACKGROUND OF THE INVENTION

Field of the invention

This invention relates to anchoring devices and is directed more particularly to an expansion bolt assembly which may be expanded to engage the interior of an opening in a wall or like structure to firmly anchor the bolt in the structure.

Description of the prior art

Expansion bolts are extensively used in the fastener field. One type of bolt includes expansion elements which are mounted on the periphery of a portion of a bolt and lie within the circumference of the bolt before the bolt is anchored. The expansion elements are urged to a position protruding from the circumference of the bolt during the bolt anchoring operation. In the protruded position, the elements engage the wall of the bore in which the bolt is disposed to insure secure anchoring of the bolt in the bore. Devices of this type are particularly useful in attaching brackets or the like to concrete walls, which otherwise are difficult to work with.

Most of the devices of the type above described include a plurality of expansion members which are urged out of recesses in the bolt to exert a holding action on particular points within a bore. Generally, expansion bolts of this type include slide members mounted on wedge-shaped or frusto-conical shaped portions of the bolt body. While such bolts have performed satisfactorily, they have shortcomings which are overcome by the instant invention.

One of these shortcomings is the lack of sufficient holding power for heavy-duty operations. It frequently happens that in heavy-duty applications the reduced portion of the bolt pulls through the expansion members and is thereby released from the bore in which it is disposed.

Another reason for the insufficient holding power of prior art expansion bolts is the lack of provision of a holding capability entirely about the periphery of the bolt as opposed to exertion of a holding action on particular points within the bore. There have been attempts to use wedge members forming a ring completely surrounding the bolt, thereby providing a holding a capability entirely about the periphery of the bolt. However, at least two expansion members are gnerally required to complete the ring inasmuch as the outside diameter of the ring does not usually exceed the diameter of the bolt upon which it is mounted. Difficulty has been encountered in retaining the expansion member on the bolt when the bolt is being used. It is desirable that the expansion members be attached to the bolt in such a manner that the bolt and expansion members may be handled as one unit from sale to use. One solution to the problem has been to simply tape the expansion members around the bolt. While this has, in most instances, held the assembly together until use, the tape readily tears when the bolt is expanded and the expansion members are wedged against the wall of the bore unevenly, there being nothing but the tape to influence their moving together. In addition, it is not economical to bind the expansion members together with tape in the manufacturing process.

Another solution to the problem, as shown in U.S. patent application Ser. No. 559,234, filed June 21, 1966 in the names of Martin M. McDonough and Raymond L. Peterson now abandoned, is to interlock the expansion members by a tongue and groove arrangement. While this operates to hold the assembly together until use and also operates to promote equal movements of the expansion members in operation, it increases the cost of manufacture.

It is preferable to have an anchor bolt assembly in which the various elements are mechanically locked together without the necessity of applying another element, such as tape, to hold the assembly together, and with provision for moving the expansion members into gripping position evenly, the assembly being economically to manufacture and having greatly increased holding power suitable for heavy-duty applications.

Summary of the invention

Accordingly, it is an object of the present invention to provide an expansion bolt assembly having greatly increased holding power.

It is another object of the present invention to provide an improved expansion bolt assembly having expansion members extending substantially around the periphery of the bolt.

It is a further object of the invention to provide such a bolt assembly in which the expansion members are retained by the bolt without the use of an additional element, such as tape and the like.

It is a still further object of the invention to provide such a bolt assembly in which the expansion members are connected to each other so that in the expanding of the bolt the expansion members move equally and exert substantially equal gripping forces on the wall of the bore in which the bolt is disposed.

With the above and other objects in view, as will hereinafter appear, the present invention in one aspect thereof contemplates an expansion bolt assembly comprising an elongated cylindrical bolt member which on one end has threads and on the other end has an expansion portion, the longitudinal surface of said portion being concave and defining an arc. Generally two expansion members are slidably mounted on the reduced portion. The expansion members are interconnected and made integral by at least one connecting portion so that when the members move longitudinally along the surface on which they are mounted, in an expansion operation, the expansion members maintain their respective positions relative to each other.

The above and other features of the invention, including various novel details of construction and combinations of parts, will now be more particularly described with reference to the acompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

FIG. 1 is an elevational view of the bolt portion of one form of expansion bolt assembly embodying the invention;

FIG. 2 is a perspective view of expansion members adapted for use in the illustrative expansion bolt assembly;

FIG. 3 is an elevational view of the illustrative expansion bolt assembly;

FIG. 4 is an elevational view showing the device in a concrete wall prior to being expanded and showing the expansion members in section; and FIG. 5 is an elevational view showing the device in expanded condition in the concrete wall.

DESCRIPTION OF THE PREFERRED EMBODIMENT

Referring to the drawings, it will be seen that the illustrative device includes an elongated cylindrical bolt member 2 having at one end a threaded portion 4 for receiving a nut or the like 6 (FIG. 5) and at the other end an expansion portion 8, having a base 10 which faces away from the bolt 2.

A pair of expansion members 12 are slidably disposed on the surface of the expansion portion 8 of the bolt 2. Referring particularly to FIG. 2, it may be seen that the expansion members 12 are joined by connecting means 14a, 14b which prevent the members from getting out of alignment, relative to each other, when the members move longitudinally along the surface of the bolt portion 8 during an expanding operation.

Referring still to FIG. 2, it is obvious that the two expansion members may be integral with the connecting means 14a, 14b so as to be formed as one integral unit. Accordingly, while for descriptive purposes the expansion members 12 will be referred to in the plural, it will be obvious that they may in fact be formed integrally and therefore comprise one expansion member. It will also be obvious that while two connecting means 14a, 14b are shown in FIG. 2, one or more will satisfactorily perform the interconnecting function.

Referring again to FIG. 1 it will be seen that the surface of the expansion portion 8 is concave and defines an arc $a$ which is preferably generated by a constant radius $r$. The expansion portion of the bolt 2, at its juncture with the remainder of the bolt, defines a shoulder 16 against which abut the expansion members 12 when in the non-expanded condition, as shown in FIGS. 3 and 4. When in the non-expanded condition the openings 18 at the two ends of the expansion members (FIG. 2) are of substantially the same diameter. As may be seen in FIG. 3 the diameter of the portion 8 is smallest at a point 20 removed from the shoulder 16. A point 22 removed still further from the shoulder 16 is of a diameter substantially equal to the diameter of the portion 8 at its juncture with the shoulder 16 and also substantially equal to the openings 18 defined by the expansion members 12. The expansion members may be provided with a ridge 24 which extends slightly beyond the circumference of a bolt 2 to insure all-around engagement with the walls of a bore 26 into which the bolt is placed. The largest diameter of the expansion portion 8 is at a point 27 farthest removed from the shoulder 16 and is preferably about the same or less than the diameter of the remainder of the bolt 2.

While it is preferable that the arc $a$ be defined by a radius $r$, any substantially concave expansion portion surface performs satisfactorily. Accordingly, it is not intended that "arc" be interpreted narrowly as a portion of a circle, but that it be given its broader interpretation, i.e., a surface generally arched or curved.

The expansion members 12 may be fabricated as one unit from sheet metal, such as stainless steel and rolled around the expansion portion 8 of the bolt. Thus, the expansion members are quickly and efficiently mounted on the bolt without the necessity of applying an additional holding member, such as tape, and without the necessity of aligning lugs and grooves and the like. By means (not shown) well known in the art, the fabrication and rolling of the expansion members onto the bolt can be carried out automatically.

In operation, the bore 26 is first drilled in a concrete wall or the like 28 to which a bracket or other structure 30 is to be attached, see FIGS. 4 and 5. The bolt 2, with the members 12 assembled thereon, is inserted into the bore 26. The bracket 20 is placed on the bolt and then the nut 6. As the nut 6 is tightened, the bolt 2 is carried leftwardly as viewed in FIG. 5. The members 12, however, engaging the walls of the bore 26 tend to stay where they are. As the bolt portion 8 is pulled leftwardly by the movement of the bolt, the increasing diameter of the portion 8 between the expansion members causes the members to move outwardly, breaking the connecting means 14a (FIG. 5) and becoming more and more firmly embedded in the wall of the bore. The connecting means 14b is compressed by its movement from a position on the surface of the expansion portion 8 adjacent the shoulder 16 to a position in the vicinity of the smallest diameter 20 of the portion 8. Compression of the connecting means 14b generally causes it to bulge outwardly from the expansion portion 8 and to press into the wall of the bore 26, providing additional holding action. In addition, by the connecting means 14b remaining intact during the expansion operation, the expansion members 12 are urged to move together, even after the connecting means 14a has parted, so as to insure substantially equal all-around hold action. Thus, the bolt is securely anchored in the bore 26 and thereby the bracket 30 is securely fixed to the concrete wall 28. To facilitate ready parting of the members 12 as they are urged by the portion 8 away from each other, the connecting means 14a may be provided with a weakened portion, as by providing a groove 32 (FIG. 2) in the means 14a.

It has been found that the bolt assembly of this invention has greatly increased holding power over a like assembly having a cone portion substituted for the portion 8 of the present invention. While the reasons for this are not entirely understood, it is believed that the surface of the portion 8 being of increasing diameter and constantly changing rate of diameter increase, tends to urge the expansion members ever more sharply outwardly and further, minimizes any tendency of the expansion portion of the bolt slipping through the expansion members as is experienced with cone-shaped portions in bolts of similar construction.

The bolt of the present invention has demonstrated a holding capacity of more than double that of a bolt constructed similarly but having a frusto-conical shaped portion of reduced diameter in place of the portion 8 illustrated herein having a surface defined by a concave curve. Accordingly, it is expected that the present invention will have application in heavy industry where bolts having a similar appearance, but having a conical expansion portion, would not.

Having thus described my invention, what I claim as new and desire to secure by Letters Patent of the United States is:

1. An expansion bolt assembly comprising an elongated cylindrical bolt member, one end of said bolt member having an expansion portion, the longitudinal surface of the portion defining a concave curve, said expansion portion substantially throughout its length being of lesser diameter than the remainder of the bolt member, the largest diameter of said expansion portion being at a point on said portion farthest removed from said remainder of the bolt, and expansion means mounted on said portion, said portion being slidable within said expansion means during an expanding operation, said expansion means comprising expansion member portions which are integrally joined by a connecting portion of the expansion means, said expansion member portions being disposed on said expansion portion in a manner opposing each other, the expansion member portions being separated from each other on the side of the bolt opposite from the side on which the connecting portion is disposed, the internal and external surfaces of said expansion member portions being inclined from each end thereof outwardly from the bolt member to form an external ridge on said expansion means, said ridge being adapted to engage the walls of a bore in which the bolt assembly is disposed, and said connecting portion being adjacent at least one slot formed by the two expansion member portions.

2. The invention acording to claim 1 in which said curve comprises an arc generated by a constant radius.

3. An expansion bolt assembly comprising an elongated cylindrical bolt member, an expansion portion disposed on said bolt member, the longitudinal surface of the expansion portion defining a concave curve, expansion means disposed for slidable engagement on said expansion portion, said expansion means comprising an expansion member bowed outwardly from either end thereof to form an external ridge, the internal surface of said expansion member engaging the curved surface of said expansion portion only adjacent the ends of said expansion member, said expansion means and said expansion portion being of such configuration that when moved relative to each other during an expanding operation a first portion of said expansion means is caused by said expansion portion to move outwardly from the longitudinal centerline of the bolt and a second portion of said expansion means is caused to move inwardly toward the longitudinal centerline of the bolt.

4. An expansion bolt assembly comprising an elongated cylindrical bolt member having an expansion portion at one end thereof, the longitudinal surface of the expansion portion defining a concave curve, the smallest diameter of said expansion portion being intermediate the ends of said expansion portion, at least one expansion member mounted on said expansion portion and extending substantially around said expansion portion, said expansion member being bowed outwardly from either end thereof to form a circular external ridge on said expansion member, the internal surface of said expansion member engaging the curved surface of said expansion portion only adjacent the ends of said expansion member, said ridge being engageable with the inside wall of a bore in which the assembly is disposed, said expansion member being movable slidably relative to said expansion portion surface, the first portion of said expansion member extending from a first end thereof to said ridge being movable generally outwardly from the longitudinal centerline of said bolt and a second portion of said expansion member extending from a second end thereof to said ridge being movable generally inwardly toward the longitudinal centerline of the bolt.

References Cited

UNITED STATES PATENTS

| 1,407,570 | 2/1922 | Pierce | 85—64 |
| 1,755,489 | 4/1930 | Phillips | 85—72 |
| 1,850,768 | 3/1932 | Pierce | 85—74 |
| 2,052,793 | 9/1936 | Pierce | 85—74 |
| 3,200,693 | 8/1965 | Dickow | 85—74 |
| 3,257,891 | 6/1966 | Lerich | 85—79 |
| 3,277,770 | 10/1966 | McCulloch | 85—79 |

FOREIGN PATENTS

| 80,143 | 2/1963 | France. |
| 48,678 | 11/1930 | Norway. |

MARION PARSONS, JR., *Primary Examiner.*

U.S. Cl. X.R.

85—77

FO-1050
(5/69)

UNITED STATES PATENT OFFICE
CERTIFICATE OF CORRECTION

Patent No. 3,448,651          Dated June 10, 1969

Inventor(s) La Roy B. Passer

It is certified that error appears in the above-identified patent and that said Letters Patent are hereby corrected as shown below:

Column 4, Claim 1, line 66, after "the" insert --expansion--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents